No. 730,175. Patented June 2, 1903.

UNITED STATES PATENT OFFICE.

JOKICHI TAKAMINE, OF NEW YORK, N. Y.

PROCESS OF OBTAINING PRODUCTS FROM SUPRARENAL GLANDS.

SPECIFICATION forming part of Letters Patent No. 730,175, dated June 2, 1903.

Application filed November 5, 1900. Serial No. 35,546. (No specimens.)

*To all whom it may concern:*

Be it known that I, JOKICHI TAKAMINE, a subject of the Emperor of Japan, residing in the city of New York, county and State of New York, have invented a certain new and useful Process of Obtaining a new and useful Product from Suprarenal Glands; and I do hereby declare the following to be a full, clear, and exact description of the invention, such as will enable others skilled in the art to which it appertains to make and use the same.

This invention relates to the production of a new product possessing the active blood-pressure-raising astringent and hemostatic characteristics and properties of the suprarenal glands in a concentrated form. This new product possesses a remarkable power of raising blood-pressure of animals when injected into veins and also has the property of contracting blood vessels when applied to the vein either directly or by means of subcutaneous injection; and the invention comprises a process for producing such product in an economical and practical manner.

It is a well-known and established fact that the suprarenal glands or capsules of various animals, including man, contain peculiar constituents, which have remarkable astringent, hemostatic, and other valuable properties, and these properties have been variously utilized in medical, surgical, and other arts. The usual method of utilizing these properties is to desiccate the gland and grind the whole mass into powder form. In case it is desired to stop bleeding the powder is applied to the desired spot, or to affect the heart it may be administered through the mouth. Another form in which it is used is that of an aqueous extract. For this purpose the fresh gland may be treated with water, so as to extract the soluble constituents, and the extract thus obtained may be sterilized or treated with some antiseptic agents with the view of making more or less permanent solution.

It will be readily seen that the desiccated powder contains a very large amount of foreign substance other than the active constituents referred to and also that the extract while somewhat purer in comparison than the desiccated powder still contains a large percentage of foreign substance, consisting of both organic and inorganic bodies, which have a considerable deteriorating effect upon the said active constituents of the glands.

Various attempts have been made to obtain from the suprarenal glands a product possessing the physiological characteristics and properties herein referred to; but these attempts have failed to produce a product which would be permanent and contained the active constituent in concentrated and isolated form free from inert and contaminating matter. By the process herein described I have succeeded in obtaining this product possessing in concentrated, permanent, undiluted, and uncontaminated form the herein-described physiological characteristics, properties, and reactions of the suprarenal glands.

In carrying out my invention I make a fluid extract of the clean suprarenal capsules from animals—such as cattle, sheep, &c.—by disintegrating the said capsules by suitable means, then mixing with about the same weight of water and steeping at a temperature of about 60° to 75° centigrade for the period of about five to ten hours in a suitable vessel, preferably avoiding contact with atmospheric air. This can be to a great extent accomplished by a film of fat floating on top of the liquid or may be done by passing a slow current of hydrogen or carbon dioxid into the top part of the vessel. The object of this is to prevent the oxidation of the extract. The film of fat referred to may conveniently be the fat naturally associated with the glands. At the latter part of the steeping the temperature of the mixture may be raised from 85° to 100° centigrade. The mass is now strained, and the residue is pressed to squeeze out as much liquid as possible. The residue thus pressed out is steeped again with the least amount of water to cover the mass for several hours at the same temperature as above. The two extracts thus obtained are mixed, and the mixture is cooled rapidly and the solidified fat removed. The liquid is now evaporated at a low temperature, preferably in a vacuum-pan, admitting, if necessary, a small quantity of hydrogen or carbon dioxid to replace air and to prevent oxidation. The liquid is evaporated until it becomes one-fifth to one-seventh of the original volume. To this concentrated solution two to three times its own volume of alcohol is added, so that the mixture will contain about sixty per cent. of alcohol by volume. This addition of alcohol will precipitate non-active bodies, such as albuminoids, phosphates, and other mineral salts. It is then filtered and the filtrate distilled under vacuum to separate the alcohol which is condensed and recovered in a suitable manner. The liquid is thus concentrated to such a degree that its specific gravity becomes 1.05 to 1.15, and caustic-soda or caustic-potash solution of about thirty per cent. strength is gradually and carefully added, taking due precaution not to overheat the liquid, until the mixture shows a strong alkaline reaction. At this stage an amount of ammonium chlorid corresponding to one-half of the molecular weight of the caustic soda used is added and made to dissolve in the liquid. The solution is now allowed to remain in a cool place from twelve to twenty-four hours, when the formation of a crystalline substance will be observed in this liquid, and its formation will be completed during that space of time. This crystalline substance will be found to consist of conglomerations of microcrystals. The quantity of caustic alkali to be added is regulated so that the alkali added will dissolve or redissolve the substance sought, the quantity of alkali used being about 0.3 to 0.4 per cent., in weight, of the original gland used, and the amount of ammonium chlorid to be added is regulated in such a way that it will nullify the excess of the caustic alkali used, it being understood that the solvent action is due to fixed caustic alkali and is not exerted by ammonia.

The caustic alkali used may be any of the substances generally recognized as of a caustic alkaline nature, as the hydrates of sodium, potassium, calcium, barium, and the like.

Instead of adding ammonium chlorid after the addition of the caustic alkali carbon dioxid may be passed into the solution. Then the formation of white silky microcrystals will be observed. The carbon dioxid is passed until no more precipitate is formed. This crystalline substance is filtered and washed with water and alcohol and dried. This constitutes the new product sought. This crystalline substance is difficultly soluble in water, but readily dissolves in weak alkali as well as in weak acid. This solubility may be availed of in the step of making the fluid extract from the glands by acidulating the water used, thus obtaining the extract more readily.

In order to further purify the substance, the following methods may be used, namely: The crude mass is dissolved in the least amount possible of weak acid, such as acetic or hydrochloric acid. The solution is then filtered, preferably after the addition of strong alcohol to precipitate mineral matters, if necessary, and caustic ammonia or alkaline carbonates are added, so as to make the solution strongly alkaline. The substance will then crystallize out in much purer form than before, being practically free from inorganic matter. This process of recrystallization may be repeated until the substance becomes quite pure, or the crude substance may be dissolved in the least possible amount of weak caustic alkali, filtered, if necessary, and carbon dioxid is now passed into the solution. White crystalline precipitate of the substance will be formed. The recrystallization may be repeated as often as necessary. This substance dissolves more readily in hot water than cold, and this property can be utilized for its recrystallization. For this purpose the substance is heated with water slowly to the boiling-point in presence of an excess of the substance. The liquid is filtered while hot, and the filtrate on cooling will deposit the substance in fine crystalline form. It will crystallize out in tabular form or in triangular prism or fine needle form. This said substance possesses all the characteristic properties of the suprarenal glands, being astringent and hemostatic to an extraordinary degree, as well as a powerful reducing agent. For instance, its aqueous solution of one to one thousand parts of water shows equal strength with the fresh aqueous extract made from fresh glands in proportion of eight parts of glands to ten of water. This aqueous solution of the said substance forms a characteristic green coloration with ferric-chlorid solution when acid, and when alkaline in reaction it forms a fine carmine red. It gives a red coloration with iodin water, reduces solution of silver and gold salts, and various other chemical reactions characteristic of the suprarenal glands, this being, however, the first time that a substance has been produced possessing in permanent, concentrated, undiluted, and non-contaminated form the herein-described physiological properties, reactions, and characteristics of the suprarenal glands.

The substance obtained as a result of my process readily combines with various acids, forming corresponding salts—such as sulfate, chlorid, phosphate, &c.—which can be crystallized from this solution by suitable and usual means, this being again the first time a pure salt having the herein-described physiological properties, characteristics, and reactions has been obtained from the suprarenal glands. During the manipulation with this substance it must be carefully observed to avoid oxidation from absorption of oxygen from the air, and due precautions should be taken for this purpose.

The product is not claimed in this case, but is claimed in my divisional application for Letters Patent, Serial No. 138,969, filed January 14, 1903.

Having thus described my invention, the following is what I claim as new therein and desire to secure by Letters Patent:

1. The process of obtaining the herein-described product of suprarenal glands, which consists in making a fluid extract of said glands, treating said fluid extract with a precipitant for the non-active bodies, removing said precipitated bodies, treating the residue with a solvent, and adding a neutralizing agent for the solvent to precipitate the said product.

2. The process of obtaining the herein-described product of suprarenal glands which consists in making an aqueous extract of the glands, precipitating from said extract the non-active bodies, removing said precipitate, treating the remainder with a solvent, and adding a neutralizing agent for the solvent to precipitate the said product.

3. The process of obtaining the herein-described product of suprarenal glands which consists in making an aqueous extract of the glands, precipitating from said extract the non-active bodies, removing said precipitate, treating the remainder with a solvent, and adding a neutralizing agent for the solvent to precipitate the said product, said process being performed in a non-oxidizing atmosphere.

4. The process of obtaining the herein-described product of suprarenal glands, which consists in making an aqueous extract of the glands, concentrating it to suitable strength, adding alcohol to precipitate non-active albuminoid and mineral matters, concentrating the filtrate, adding to it fixed caustic alkali, adding a neutralizing agent, to precipitate the said product, washing the precipitate with suitable liquid, and drying the product, all substantially as described.

5. The process of obtaining the herein-described product of suprarenal glands, which consists in concentrating an aqueous solution of the fresh gland, adding alcohol to precipitate inert albuminoids and mineral matters, evaporating the alcohol and water to further concentrate the liquid, then adding a solution of fixed caustic alkali, then adding ammonium chlorid to precipitate the said product in crystalline form, washing the precipitate with suitable liquid, and drying the same, all substantially as set forth.

6. The process of obtaining the herein-described product of suprarenal glands, which consists in steeping in water the comminuted glands at a suitable temperature for a suitable number of hours; separating the soluble matter by filtration and pressing; evaporating the filtrate to such consistency that the inert albuminoid and mineral salts will crystallize out, by addition of a suitable amount of alcohol, adding a suitable amount of alcohol to precipitate the maximum amount of inert albuminoid and mineral matters, evaporating off the alcohol, and further evaporating the liquid to a suitable strength; adding a solution of fixed caustic alkali, and then adding ammonium chlorid in sufficient quantities to counteract the excess of caustic alkali, and allowing the solution to precipitate the said product in crystalline form, separating the crystalline precipitate, washing with water and alcohol, and drying the product, all substantially as described.

7. The process of obtaining the herein-described product of suprarenal glands, which consists in steeping in water the comminuted glands at a suitable temperature for a suitable number of hours, separating the soluble matter by filtration and pressing; evaporating the filtrate to such consistency that the inert albuminoid and mineral salts will crystallize out, by addition of a suitable amount of alcohol, adding a suitable amount of alcohol to precipitate the maximum amount of inert albuminoid and mineral matters, distilling off alcohol, and further evaporating the liquid to a suitable strength, adding a solution of fixed caustic alkali to dissolve the said product, adding a neutralizing agent to counteract the excess of fixed caustic alkali and precipitate the said product in a crystalline form, until no further precipitate will be formed, washing the precipitate with water and alcohol and drying the product, and then redissolving this crystalline product in a non-neutral solution, adding alcohol to precipitate mineral salts, filtering and adding a neutralizing agent to reprecipitate the said product, all substantially as described.

8. The process of refining and preparing the herein-described product of the suprarenal glands in purer form, which consists in dissolving the said product in dilute acetic acid, adding strong alcohol to precipitate the mineral salts that may be present, filtering the liquid and adding to it caustic ammonia to precipitate the said product in purer form, washing the precipitate with water and alcohol and drying same, all substantially as set forth.

9. The process of refining and preparing the herein-described product of the suprarenal glands in purer form, which consists in dissolving the said product of the suprarenal glands in a non-neutral solution, filtering and treating the solution with a neutralizing agent to precipitate the said product in a crystalline form, filtering, washing with water and alcohol and drying, all substantially as described.

JOKICHI TAKAMINE.

Witnesses:
J. GREEN,
A. P. KNIGHT.